United States Patent

[11] 3,634,030

[72] Inventors Joseph H. Balthis, Jr.
  Mendenhall, Pa.;
  Walter W. Gilbert, Hockessin, Del.
[21] Appl. No. 859,170
[22] Filed Sept. 18, 1969
[45] Patented Jan. 11, 1972
[73] Assignee E. I. du Pont de Nemours and Company
  Wilmington, Del.

[54] PROCESS FOR THE PREPARATION OF FERROMAGNETIC CHROMIUM OXIDE BY REMOVING WATER BEFORE COOLING SYNTHESIS MIXTURE
  10 Claims, No Drawings

[52] U.S. Cl. .................................................. 23/145, 252/62.51
[51] Int. Cl. ......................................... C01g 37/02, C04b 35/00
[50] Field of Search ........................................... 23/145; 252/62.51

[56] References Cited
UNITED STATES PATENTS

| | | | |
|---|---|---|---|
| 2,956,955 | 10/1960 | Arthur, Jr. .................. | 23/145 |
| 3,278,263 | 10/1966 | Cox .......................... | 23/145 |
| 3,034,988 | 5/1962 | Ingraham et al. ............. | 252/62.51 |
| 3,117,093 | 1/1964 | Arthur, Jr. et al. ........... | 252/62.51 |

*Primary Examiner*— Oscar R. Vertiz
*Assistant Examiner*—Hoke S. Miller
*Attorney*—James H. Ryan

ABSTRACT: In the preparation of ferromagnetic chromium oxide in aqueous media the removal of water after reaction is complete, but before the reaction mixture is cooled below 225° C.

PROCESS FOR THE PREPARATION OF FERROMAGNETIC CHROMIUM OXIDE BY REMOVING WATER BEFORE COOLING SYNTHESIS MIXTURE

The present invention is an improvement in processes for the preparation of ferromagnetic chromium dioxide, Cr(IV) oxide, of high saturation induction. More particularly, the present invention is an improvement in processes for preparing ferromagnetic $CrO_2$ particularly suitable for use in recording members.

A number of processes have previously been described for the preparation of $CrO_2$, including processes yielding modified as well as unmodified products, in a variety of particle size ranges. The processes giving products of interest for use in recording members employ chromium oxides such as $CrO_3$, $Cr_2O_5$, and $Cr_3O_8$ as starting materials and involve heating these oxides alone or in mixtures with one another and with other materials in the presence of water and usually under superatmospheric pressure. After the reaction is completed, the reaction mixture is cooled to approximately room temperature to avoid degradation of the product at high temperature, the pressure then released, and the product removed from the reaction vessel. The product so obtained is a moist mass which must be dried and purified, e.g., by magnetic separation, before use. Preliminary to such drying, it is customary to crush the mass and to wash the crushed product with water. Sometimes a final wash with a low-boiling water-miscible organic solvent is employed to facilitate drying. This washing and drying procedure is laborious, time consuming, and may lead to degradation in magnetic properties.

The present process improvement overcomes these deficiencies in the preparation of $CrO_2$ in aqueous media by the surprisingly simple expedient of removing water after reaction is complete, but before the reaction mixture has been cooled below 225° C. In this so-called "bleedoff" method, removal of water can be accomplished by flushing the reaction vessel with an oxidizing gas, such as dry air or dry oxygen, while the pressure is maintained at substantially reaction pressure. This can be done, for example, by bleeding off a portion of the reaction vapor, repressuring with dry air or oxygen, and repeating alternate bleedoff and repressuring until water in the reaction mixture has been removed.

Alternatively, the pressure may be reduced below the synthesis pressure, say, to a pressure of 1–500 atmospheres, thereby removing water from the reaction mixture to an extent dependent upon the reduction in pressure, the product then cooled and any remaining pressure finally released. If desired, the reaction vessel may be flushed with dry air or oxygen before cooling. For simplicity, it is preferred to bleed off the reaction vapors completely, i.e., to reduce the pressure to atmospheric pressure, before the reaction mixture has cooled below 225° C. If the vessel is not flushed with an oxidizing gas, it is sometimes desirable to allow the vessel at 225° C. or above to stand open to the atmosphere for a few minutes, such as 5–15 minutes, to ensure complete removal of water. Whatever method is employed for removing water, the vessel should be closed before cooling to room temperature.

When the synthesis is carried out at temperatures substantially above 225° C., the temperature can, if desired, be reduced before bleedoff, and this method of operation is preferred when a reaction temperature in excess of about 400° C. is employed. When the reaction has been carried out at a temperature in the range of 225°–400° C., it is usually easier, however, and not detrimental to the product to bleed off at reaction temperature. Whatever sequence is employed, the bleedoff process eliminates the need for washing and drying the product, and produces directly and simply a high-quality, completely dry $CrO_2$. Contrary to previous expectations, the magnetic properties of this product are generally equal and may be superior to those of products prepared by the earlier, more laborious processes.

The bleedoff method may be applied to any of the processes for preparation of $CrO_2$ which are carried out under superatmospheric pressure in an aqueous medium. Among such processes are those described in U.S. Pat. Nos. 2,885,365; 2,923,683; 2,923,684; 2,923,685; 3,034,988; 2,956,955; 3,117,093; and 3,278,263. The processes of these patents employ as starting materials chromium oxides wherein the average valence of the chromium is other than 4, and they involve the conversion of these oxides to chromium(IV) oxide by heating them alone or in mixtures with one another or with other materials. Some of these processes may also include the use of various modifying agents such as antimony, iron, ruthenium, and tin to influence in a desired manner the properties of the $CrO_2$ produced. In all these processes, water is present as a reaction medium in an amount of at least 1 percent by weight of the starting chromium oxide compounds or of the conversion products thereof. Usually somewhat larger amounts in the range of 5–300 percent by weight of water are employed. Upon completion of the reaction of any of these processes, recovery of a dry $CrO_2$ product from such relatively large quantities of water requires additional costly operating steps. Moreover, it is known that the magnetic characteristics of ferromagnetic chromium(IV) oxide are adversely affected by exposure to hot, moist conditions. Rapid, inexpensive removal of water from the reaction vessel is desirable to eliminate these disadvantages, and it is this requirement to which the process improvement of the instant invention is addressed.

The product obtained when the bleedoff process is employed is ferromagnetic chromium dioxide which may contain modifying materials if these have been used in the synthesis. The product is in the form of small crystals which are usually aggregated into a friable mass. As ordinarily prepared the product can be used directly and does not require further drying or purifying treatments. The crystals, when unmodified, contain chromium in an amount of about 60 to about 62 percent by weight; the content of chromium and modifying material, if present, will be as described in the above-mentioned patents. X-ray examination shows the crystals to have a tetragonal crystal structure of the rutile type. The crystals possess outstanding magnetic properties, including a saturation induction per gram of sigma value, $\sigma_s$, of about 80 gauss cm.$^3$/g. or higher. The remanence ratio, i.e., the ratio of the remanent induction per gram, $\sigma_r$, and usually is in the range of 0.35–0.5 as measured on randomly oriented powdered samples. Products having a coercive force above about 200 oersteds are particularly suited for use in the preparation of magnetic recording members.

The sigma values reported herein are defined on pages 5–8 of Bozorth's "Ferromagnetism," D. Van Nostrand Company, New York (1951). These sigma values are determined in a field of 4,400 oe. on apparatus similar to that described by T. R. Bardell on pages 226–228 of "Magnetic Materials in the Electrical Industry," Philosophical Library, New York (1955). The definition of intrinsic coercive force, $H_{ci}$, is given in Special Technical Publication No. 85 of the American Society of Testing Materials entitled "Symposium on Magnetic Testing" (1948), pages 191–198. The values for the intrinsic coercive force given herein are determined on a DC ballistic-type apparatus which is a modified form of the apparatus described by Davis and Hartenheim in the Review of Scientific Instruments, 7, 147 (1936).

Any reaction vessel capable of providing the desired reaction conditions is suitable for carrying out the process. Appropriate equipment is described, for example, in the aforementioned U.S. patents. The reaction vessel, or at least the interior thereof, preferably should be resistant to the reaction mixture. It is often convenient to use a pressure vessel with a top opening. A flexible-walled, sealed platinum tube, i.e., one having walls sufficiently thin to transmit external pressure to the tube contents, may be employed to contain the reaction mixture. Such a tube is placed inside a larger pressure vessel to achieve desired reaction conditions. During bleedoff, such a tube ruptures when the pressure generated by the reaction mixture substantially exceeds the supporting pressure provided by the pressure vessel, thus permitting removal of the water.

The process of the invention is illustrated further by the following examples in which quantities of ingredients are expressed in parts by weight, except as noted.

EXAMPLE 1

By the general procedures described in Cox U.S. Pat. 3,278,263, hydrous chromia ($Cr_2O_3 \cdot 9H_2O$) was prepared and then dried in air at about 470° C. for 3 hours. A mixture of 100 g. of the $Cr_2O_3$ thus produced and 200 g. of $CrO_3$ was made, thoroughly blended, then mixed with 75 ml. of water with cooling. The mixture was put into a 1¼×8-inch platinum cup, which was subsequently placed in a pressure vessel containing 10 ml. of water. The pressure vessel, which contained an inside thermocouple well and a top opening for admitting or bleeding off gas, was closed and air was displaced with oxygen. Oxygen pressure (200 atmospheres) was applied, and the vessel was heated over a period of 3.7 hours to a temperature of 350±5° C. and a pressure of 815±15 atmospheres, then held at these conditions for an additional 6 hours. Water was largely eliminated in the next 1½ hours by bleeding to 500 atmospheres and building up oxygen pressure to 750 atmospheres 15 times. The vessel was then cooled to room temperature, and the remaining pressure was released.

The dry, black reaction product weighed 290 g. A portion was washed six times in the absence of air with 2:1 acetic acid/acetic anhydride (washings were colorless), rinsed with cyclohexane, dried in vacuo at 25° C., and pulverized. Magnetic properties were: Hci, 260 oe.; $\sigma_s$, 87.4 gauss cm.³/g.; $\sigma_r$, 32.9 gauss cm.³/g.; $\sigma_r/\sigma_s$ 0.38.

EXAMPLE 2

The reactants, equipment, and general procedures of example 1 were again used, except that the pressure vessel, under oxygen pressure of 200 atmospheres as before, was heated over a period of 3.7 hours to a temperature of 350° C. and a pressure of 875±15 atmospheres, then held at these conditions for an additional approximately 8 hours. Water was completely eliminated at 350° C. over a period of 10 hours by: (1) bleeding to 500 atm. pressure; (2) pressuring with oxygen to 650 atmospheres and bleeding to 500 atmospheres 20 times; and (3) pressuring with oxygen to about 750 atmospheres and bleeding the 500 atmospheres 19 times. The reactor was then cooled to room temperature under autogenous pressure, the remaining pressure was released, and the reaction product (273.5 g.) was removed from the platinum cup in dry nitrogen.

One portion of the product was washed repeatedly with 2:1 acetic acid/acetic anhydride under nitrogen (no color developed showing that the $CrO_2$ was free of $CrO_3$), followed by rinsing with cyclohexane, vacuum drying, and screening (through 60 mesh). Magnetic properties were:

coercivity, Hci =248 oe.
saturation magnetization, $\sigma_s$=89.1 gauss cm.³/g.
remanence, $\sigma_r$=31.6 gauss cm.³/g.
ratio of $\sigma_r/\sigma_s$=0.354

A second portion was washed six times in air with water, rinsed with acetone, dried in vacuo, and screened. Magnetic properties were:

coercivity, Hci =248 oe.
saturation magnetization, $\sigma_s$=88.9 gauss cm.³/g.
remanence, $\sigma_r$=32.6 gauss cm.³/g.
ratio of $\sigma_r/\sigma_s$=0.367

Both portions of the product had particles 0.03-0.1 micron wide by 0.08-1 micron long with only a few larger particles.

EXAMPLES 3-8

These examples illustrate bleedoff to various final pressures in the preparation of high-quality chromium dioxide.

In these examples, the reaction mixture consisted of 350 g. $CrO_3$ (reagent grade), 175 g. $Cr_2O_3$ (prepared from $Cr_2O_3 \cdot 2-3H_2O$ dried at about 620° C. for 3 hours in air), and 131 ml. water. The reactants were mixed as described in the table below under the column identified by "stirring" and placed in an 11.5×1.75-inch platinum cup. The cup was placed in a 25.5×2.25-inch pressure vessel containing 40 ml. of water. The pressure vessel was fitted with a thermocouple well, to a top opening to admit oxygen, and a dip-leg, located between the platinum cup and the inside wall of the pressure vessel, and reaching to the bottom of the vessel, through which water and/or gas could be withdrawn.

After air was expelled with oxygen, the reaction vessel was pressured with 185-200 atmospheres of oxygen, heated over a period of about 4 hours to a temperature of 350° C. and a pressure of 510±10 atmospheres, then held at these conditions for an additional 8 hours.

Subsequent processing conditions were as described in the table below, which also shows magnetic properties for the $CrO_2$ obtained.

TABLE.—BLEED-OFF TO VARIOUS PRESSURES

| Example Number: | Stirring Method [1] | Stirring Time (hours) | Pressure after bleed-off (atm.)[2] | Hci (oe.) | $\sigma_s$ | $\sigma_r$ | $\sigma_r/\sigma_s$ |
|---|---|---|---|---|---|---|---|
| 3 | A | * | 1 | 280 | 84.1 | 32.8 | 0.39 |
| 4 | B | 2.25 | 1 | 390 | 86.0 | 38.7 | 0.45 |
| 5 | B | 2.67 | **1 | 385 | 85.7 | 38.7 | 0.45 |
| 6 | B | 2.9 | **68 | 390 | 87.7 | 39.1 | 0.45 |
| 7 | C | 0.5 | **10 | 417 | 85.0 | 38.5 | 0.45 |
| 8 | C*** | 0.5 | **10 | 392 | 85.9 | 38.9 | 0.45 |

[1] Method A: Stirred manually at ice bath temperature; Method B: Stirred with a power driven paddle agitator with no external heating or cooling; Method C: Stirred at about 1,725 r.p.m. with 6-blade propeller-type stirrer with no external heating or cooling.
[2] Bleed-off temperature was 350° C.
[3] After homogenization of the product in a dry box by grinding and sieving through a 100 mesh screen. Measurements of $\sigma_s$ made in a 4,400 oe. field.

NOTE:
*The $CrO_3$ and $Cr_2O_3$ were mixed by rolling in a bottle, allowed to stand 64 hours in a sealed bottle, and then mixed with water by brief manual stirring at ice water temperature.
**Flushed after bleed-off before cooling with dry oxygen at 5 l./min. until test for moisture in exit gas was negative.
***Charge stood 5.25 days in stoppered platinum cup after stirring before conversion.

EXAMPLE 9

The reactants used in this example were the same as those for examples 3-8 and were used in the same proportions. The reactants were mixed by method C referred to in the table and were placed in a platinum cup which was then stoppered and stored for 5 days at room temperature. The cup was then inserted in a pressure vessel containing water, and the air in the vessel was replaced with oxygen. The vessel was closed, the pressure was increased to 190 atmospheres with oxygen, and the vessel was heated over a period of 2.75 hours to a temperature of 325° C. At this point oxygen was added to adjust the total pressure to 500 atmospheres, and conditions of 325° C. and 500 atmospheres pressure were maintained for a period of 8.5 hours. At the end of this period, while the pressure vessel was still at 325° C., water and gas were bled off through the dip-leg to a pressure of 10 atm., and dry oxygen at the same pressure was admitted to the top of the pressure vessel at about 5 cu.ft./min. Bleedoff of oxygen was continued until it was established by test that the exit oxygen was free of water. The reaction vessel was then closed and cooled whereupon the remaining pressure was released. The test employed to establish water-free conditions in exit oxygen consisted in passing the exit gases periodically over anhydrous silica impregnated with an anhydrous cobalt salt. The gases were considered to be dry when no color change occurred in the indicator.

EXAMPLE 10

This example illustrates the preparation of iron-modified chromium dioxide using the bleedoff procedure.

A charge was made up employing 350 g. of $CrO_3$, 175 g. of $Cr_2O_3$ (prepared by drying $Cr_2O_3 \cdot 2-3H_2O$ at about 620° C. for 3 hours in air), 7.5 g. of $Fe_2O_3$ (1.5 percent Fe based on $CrO_3$), and 133 ml. of water. The solid reactants were first mixed by rolling overnight in a tightly stoppered bottle. The water was then added and the mixture was rapidly stirred for 3.25 hours with no external heating or cooling. The mixture was placed in a platinum cup which in turn was introduced into a pressure vessel as described in examples 3-8. The air in the vessel was replaced with oxygen and the oxygen pressure was raised to 185 atmospheres. The vessel was heated over a period of about 5 hours to a temperature of 350° C. and a pressure of 520 atmospheres, then held at these conditions for an additional 6 hours. At the end of this period water and gas were bled off through the dip-leg to 68 atmospheres pressure while the temperature was maintained at 350° C., and the pressure vessel was flushed with oxygen at 68 atmospheres pressure until all water had been removed. The pressure vessel was finally cooled and the residual pressure released. The dry chromium dioxide so produced exhibited an intrinsic coercive force, Hci, of 540 oersteds, a $\sigma_s$ of 79.0 gauss cm.³/g., a $\sigma_r$ of 38.1 gauss cm³/g. and a remanence ration $\sigma_r/\sigma_s$ of 0.48.

Chromium dioxide prepared by the bleedoff process is useful in any of the applications for which $CrO_2$ prepared by other methods is employed, such as in the manufacture of magnetic memory cores for computers, in microwave attenuators, in magnetic clutches, and in electrically operated high-frequency switches. Products having high coercive force, i.e., those with Hci above 200 oe., are useful in fabrication of magnetic recording members.

The embodiments of the invention in which an exclusive property or privilege is claimed are defined as follows:

1. In a process for preparing ferromagnetic Cr(IV) oxide at a reaction temperature of above about 255° C. and under superatmospheric reaction pressure from a reaction mixture containing (1) at least one chromium oxide in which the valence of chromium is different from 4 and (2) water, the improvement comprising removing substantially all of the water from the reaction mixture before cooling the mixture below about 225° C.

2. The improvement of claim 1 in which the water is removed from the reaction mixture by flushing the same with an oxidizing gas while maintaining reaction pressure.

3. The improvement of claim 2 in which the oxidizing gas is oxygen.

4. The improvement of claim 1 in which the water is removed from the reaction mixture by reducing the pressure to atmospheric and subsequently flushing the mixture with an oxidizing gas at atmospheric pressure.

5. The improvement of claim 4 in which the oxidizing gas is oxygen.

6. The improvement of claim 1 in which the water is removed from the reaction mixture by reducing the pressure on the mixture below reaction pressure.

7. The improvement of claim 1 wherein a mixture of Cr(VI) and Cr(III) oxides is employed to prepare the Cr(IV) oxide.

8. The improvement of claim 7 in which the water is removed from the reaction mixture by flushing the same with an oxidizing gas while maintaining reaction pressure.

9. The improvement of claim 8 in which the oxidizing gas is oxygen.

10. The improvement of claim 7 in which water is removed from the reaction mixture by reducing the pressure on the mixture below reaction pressure.

* * * * *

UNITED STATES PATENT OFFICE
CERTIFICATE OF CORRECTION

Patent No. 3,634,030          Dated January 11, 1972

Inventor(s) JOSEPH H. BALTHIS, JR. and WALTER W. GILBERT

It is certified that error appears in the above-identified patent and that said Letters Patent are hereby corrected as shown below:

Col. 1, line 16, before "$Cr_2O_5$" insert -- $Cr_2O_3$ --

Col. 2, line 42, after "$\sigma_r$,", insert -- to the saturation induction per gram, $\sigma_s$, ranges up to 0.5 --

Col. 6, line 8 (claim 1), "255°C" should be -- 225°C --.

Signed and sealed this 21st day of November 1972.

(SEAL)
Attest:

EDWARD M. FLETCHER, JR.
Attesting Officer

ROBERT GOTTSCHALK
Commissioner of Patents